United States Patent [19]

Kwon et al.

[11] 3,973,802
[45] Aug. 10, 1976

[54] CONVEYOR LINE FLUIDIZER

[75] Inventors: Sung Lim Kwon, St. Paul; Josef Pausch, Minnetonka, both of Minn.

[73] Assignee: General Resource Corporation, Hopkins, Minn.

[22] Filed: Mar. 6, 1975

[21] Appl. No.: 556,005

[52] U.S. Cl. .................................. 302/24; 302/30
[51] Int. Cl.² ........................................ B65G 53/58
[58] Field of Search .................. 302/24, 25, 29–31, 302/46, 64, 66; 137/13; 243/6

[56] References Cited
UNITED STATES PATENTS

| | | | |
|---|---|---|---|
| 1,943,451 | 1/1934 | Needham | 302/25 |
| 2,019,968 | 11/1935 | Holloway | 302/25 |
| 2,946,628 | 7/1960 | Bauregger | 302/24 |
| 3,731,647 | 5/1973 | Mimbiole et al. | 302/24 |
| R24,716 | 10/1959 | Anselman et al. | 302/24 |

FOREIGN PATENTS OR APPLICATIONS

| | | | |
|---|---|---|---|
| 319,009 | 10/1930 | United Kingdom | 302/25 |

*Primary Examiner*—Evon C. Blunk
*Assistant Examiner*—Jeffrey V. Nase
*Attorney, Agent, or Firm*—Paul L. Sjoquist

[57] ABSTRACT

Apparatus is disclosed for insertion into a conveying system line wherein particles are conveyed by a gaseous medium. The apparatus accepts a pressurized gas input and develops therefrom in an internal chamber and annular orifice a gas flow having an internally-directed refluidizing component and a longitudinally-directed conveyor film component.

7 Claims, 3 Drawing Figures

U.S. Patent   Aug. 10, 1976   3,973,802
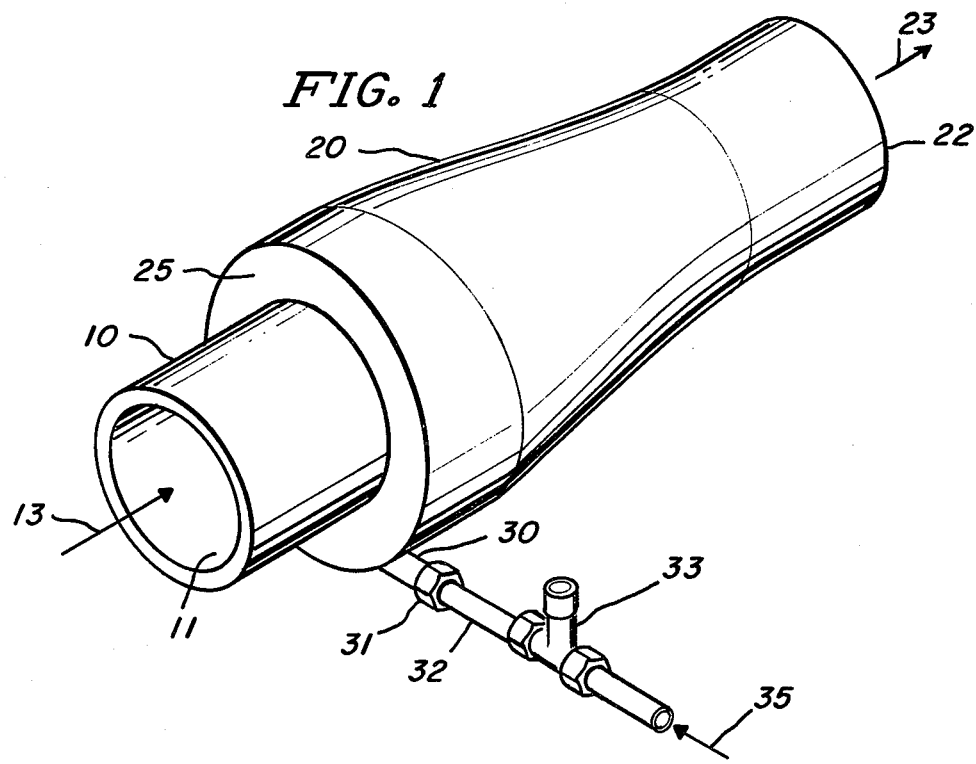
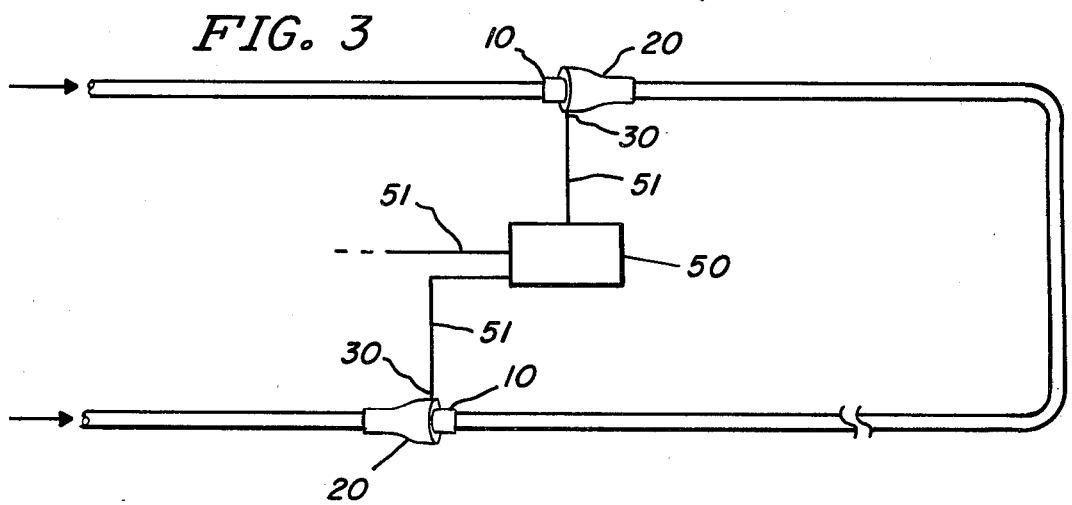
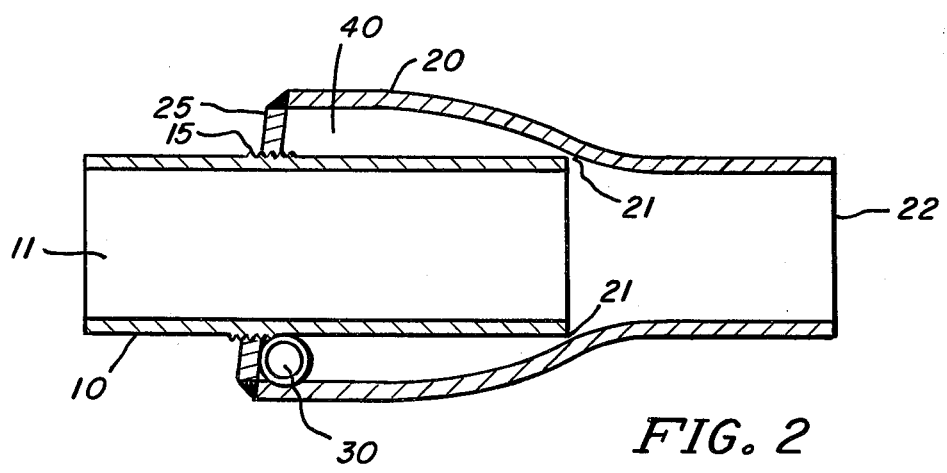

CONVEYOR LINE FLUIDIZER

BACKGROUND OF THE INVENTION

This invention relates to an apparatus for conveying particles through a closed system wherein the conveying medium is a gas. More particularly, the invention relates to an apparatus for assuring that particles remain in suspension in a gaseous stream through a closed and elongated ducting system.

The task of conveying particle materials over distance via a gaseous medium, usually air, is complicated by the problem of the material settling out along the conveying system, which not only lowers the delivery efficiency but also tends to clog the conveying system and causes blockages to develop at various points along the system. For purposes of this discussion we will refer to the gaseous medium as being air, it being understood that any other convenient gaseous medium may be used in a particular conveying system. Delivery systems using the principle of pneumatic conveying attempt to solve the problem by developing an air flow velocity which is 3–4 times the terminal velocity of the particular particles being conveyed. Solving the problem using pneumatic conveying principles naturally requires an air volume flow source of considerable magnitude. This is especially true when particular applications are examined wherein the cross-sectional area of the conveying system may be equivalent to a pipe diameter of from 2 to 12 inches, and the conveying system may be several hundred feet in total length, and wherein the flow rate must be maintained throughout the entire length of the system.

A second approach to conveying particle materials is to utilize the principle of fluidized flow. This principle utilizes air turbulence to hold the particles in suspension; particles may be conveyed utilizing an air volume flow rate velocity of from ½ to 3 times the terminal velocity of the particular particles. Fluidized flow obviously requires a lesser capacity air blower with its attendant savings in energy consumption. In either conveying approach the particular volume flow rate is dependent upon factors such as the type of material being conveyed, the interior construction of the conveying path, the length of the total conveying system, the relative elevations of inlet and outlet, as well as the geometric configuration of the entire delivery system.

Fluidized conveying provides advantages in the efficiency of operation of the conveying system in terms of enabling relatively more material to be delivered at a given air flow rate. For example, under fluidized conveying principles a pound of air will typically convey twenty or more pounds of material, of course dependent upon the material characteristics. A pound of conveying air utilizing pneumatic conveying principles is usually limited to conveying less than twenty pounds of material. In addition, fluidized conveying offers advantages in better mixing or emulsion between the air and suspended particles, less wear on the interior parts of the conveying system, and lower degradation of materials by way of particle breakup along the delivery system.

Typical fluidizing systems are described in U.S. Pat. Nos. 2,806,636 and 2,795,464, owed by the same asignee as the present invention. The present invention is adaptable for use with systems of the type disclosed in these patents and its use therein will enhance the operation of the inventions described.

SUMMARY OF THE INVENTION

The present invention is intended for use in conjunction with conveying system delivery lines wherein it may be inserted into such delivery lines at periodic intervals for the purpose of refluidizing particles being conveyed. It provides an air booster supply for restoring the conveying flow rate to an acceptable level, which also provides an air flow directional pattern to refluidize the particles passing therethrough and propagate them down the delivery line. One aspect and advantage of the invention is in that its supplemental air flow delivery provides an air film around the interior of the delivery pipe for insulating the pipe from abrasive contact with particles moving therethrough.

Briefly, the invention comprises an inlet pipe which telescopically fits into the interior of an outlet pipe having an enlarged chamber. The chamber has a forward wall of angled construction and has an air inlet receptacle for receiving pressurized air tangentially to the inner surface of the chamber. The structure of the chamber causes such pressurized air to become directed into a helical vortex which passes through an annular orifice formed between the telescoped input pipe and the interior surface of the outlet pipe. This unique and novel construction provides an air flow current which has an inwardly directed component for refluidizing particles flowing therethrough and has a downstream-directed component which creates a smooth air film for further guiding particles therethrough and insulating the particles from abrasive contact with the interior pipe surface.

Depending upon the particular conveying application, the invention herein may be placed at intervals of 10–100 feet along the conveying system to insure maximum delivery efficiency of particles which are maintained in a properly suspended state.

BRIEF DESCRIPTION OF THE DRAWINGS

A preferred embodiment of the invention is shown on the drawings which form a part of this specification, in which:

FIG. 1 illustrates the invention in side perspective view;

FIG. 2 illustrates the invention in cross-sectional view; and

FIG. 3 illustrates a typical conveying system having several embodiments of the invention installed therein.

DETAILED DESCRIPTION OF THE INVENTION

FIG. 1 illustrates the invention in side perspective view. An inlet pipe 10 is telescopically inserted into the interior of an outlet pipe 20. Air conveyed particles are admitted into inlet 11, via a suitable connection to a conveying system, in the direction indicated by arrow 13. The air suspended particles pass through the apparatus and are emitted through outlet 22 in a direction shown by arrow 23. Inlet pipe 10 is threaded into end plate 25 in a manner which will be more fully described hereinafter.

An air inlet 30 is tapped through outlet pipe 20 for the purpose of admitting pressurized air to the interior of outlet pipe 20. A suitable coupling 31 and air line 32, together with a pressure valve 33, is connected to a source of pressurized air which flows inward in a direction as indicated by arrow 35.

FIG. 2 illustrates the invention in cross-section side view. Inlet pipe 10 is threaded through end plate 25 by means of thread 15. In this manner, inlet pipe 10 may be telescopically fitted into the interior of outlet pipe 20. The interior region between the surface of inlet pipe 10 and the inner surface of outlet pipe 20 forms a chamber 40, the outlet of which is an annular orifice 21. Pressurized air is admitted into this chamber via air inlet 30 and it escapes from the chamber via annular orifice 21. It should be noted that end plate 25 is inclined forwardly at a fixed angle. The purpose of this incline is to assist in the formation of a forwardly propagating helical air vortex as a result of pressurized air entering air inlet 30. In the preferred embodiment the angle of incline for end plate 25 is approximately 5°, but in practical applications it may vary from as low as 2° to as high as 45°. In the preferred embodiment the diameter of inlet 11 is the same as the diameter of outlet 22, although larger outlet diameters may be provided for the invention. In the event the outlet pipe diameter exceeds the inlet pipe diameter, it may be necessary to form an annular orifice 21 by means of developing a built up region around the interior circumference of pipe 20 at an appropriate position. The invention is preferably constructed as described herein to avoid such unnecessary construction approaches.

In operation, inlet pipe 10 is threaded telescopically into outlet pipe 20 to create an annular orifice 21 width of approximately 1/32 – 1/16 inch. Input air pressure at air inlet 30 is adjusted to a pressure in the range of 5–100 pounds per square inch (p.s.i.), which is somewhat dependent upon the type of material being conveyed, the configuration of the conveying system, and the size of annular orifice 21. It may be necessary to adjust inlet pipe 10 for a different annular orifice 21 size, if all of the other parameters relating to the system's operation are fixed. In a particular application, the air pressure in chamber 40 is at least 10% higher than the air pressure found at inlet 11. This creates a helical vortex flow out of chamber 40 which has a downstream component tending to create an insular film along the interior surface of pipe 20 and subsequent interior conveying surfaces. The air flow developed and emitted from chamber 40 has an inwardly directed component which generates turbulence and tends to refluidize the particles passing therethrough. In order for the maximum flow benefit to be accomplished, it is important that air inlet 30 be positioned so as to provide an air flow inlet which is tangential to the inner surface of chamber 40. Also, the net cross-sectional area of annular orifice 21 must be no greater than the cross-sectional area of air inlet 30 in order to create the necessary back pressure required for operation of the invention.

If the nature of the particular conveying system is known, together with knowledge of the particles to be conveyed, the size of annular orifice 21 may be experimentally preset for maximum fluidizing in the region downstream from outlet pipe 20. The method steps necessary for accomplishing the maximum fluidizing effect are as follows:

1. Admit the particle types under the flow rate conditions desired for the system.
2. Observe the degree of fluidizing occurring in the region downstream of pipe 20.
3. Adjust the telescopic position of inlet pipe 10 and air pressure at inlet 30 until maximum fluidizing occurs.

If this procedure is followed, particles up to ¼ inch in diameter may be satisfactorily conveyed and fluidized.

The invention is useful for conveying such particles as cement, sand, flour, and any other particle of sufficient size to be suspended in an air flow stream.

FIG. 3 illustrates the invention in a typical conveying system application. Particles are passed through the system in the direction indicated by the arrows. The invention is spaced periodically along the conveying system pipe, and pressurized air from an air source 50 is coupled to each of the plurality of line fluidizers via air lines 51. The annular orifices are respectively adjusted, following the procedure outlined above, which may be accomplished either in a predetermined experimental testing arrangement or at the actual conveying system site. As hereinbefore stated, the line fluidizer may be suitably sized to accommodate installations having conveying pipes of diameter from 2 to 12 inches. The fluidizer may be manufactured from a variety of materials, including steel, cast iron, aluminum, plastic, or other materials as particular applications may necessitate.

Other embodiments are possible within the spirit and scope of the invention. For example, the essential inventive features could be accomplished by an enlarged chamber having an inclined end and which encloses the conveyor pipe itself. An annular or circumferential orifice would be cut into the conveyor pipe and the enlarged chamber would be appropriately positioned over the orifice according to the teachings of this specification, and an air pressure inlet would be provided to the enlarged chamber.

What is claimed is:
1. An apparatus for propagating particles suspended in a gaseous stream through a conveying system, comprising:
   a. an inlet pipe having a first end constructed for connection into the conveying system in axial flow alignment with said gaseous stream;
   b. an outlet pipe having a first end constructed for connection into the conveying system in axial alignment downstream of said inlet pipe, said outlet pipe having an axially-symmetric expanding contour fitted over said inlet pipe, and having an end plate closing about said inlet pipe, said end plate being inclined at an angle of from 2° to 45° from a plane which is perpendicular to the inlet pipe axial direction;
   c. a chamber external said inlet pipe and formed by the interior surfaces of said outlet pipe expanding contour and end plate, and the exterior surface of said inlet pipe, and having an annular output orifice about the interior end of said inlet pipe;
   d. an inlet for receiving pressurized gas, opening into said chamber at a point approximately tangential to the chamber inner surface and adjacent the inclined end plate at a position closest to said inlet pipe first end; and
   e. means for telescoping said inlet pipe into said outlet pipe expanded contour through said inclined end plate, for varying the chamber output annular orifice size.

2. The apparatus as claimed in claim 1 wherein said means for telescoping said inlet pipe further comprises a threaded coupling between said inlet pipe exterior surface and said inclined end plate into said outlet pipe enlarged portion.

3. The apparatus of claim 2 wherein the inlet pipe and outlet pipe connections into the conveying system are of substantially equal cross-sectional areas.

4. The apparatus of claim 3 wherein the cross-sectional area of said chamber annular output orifice is no greater than the cross-sectional area of said inlet for receiving pressurized gas.

5. The apparatus of claim 3 wherein the cross-sectional area of said chamber annular output orifice is less than the cross-sectional area of said inlet for receiving pressurized gas.

6. The apparatus of claim 5 wherein said annular orifice cross-sectional area is adjusted at a dimension whereby the pressure in said chamber exceeds the pressure at said inlet pipe by at least 10%.

7. The apparatus of claim 5 wherein said annular orifice has a radial dimension of between 1/32 inch and 1/16 inch.

* * * * *